United States Patent
Lieu et al.

(10) Patent No.: US 10,021,082 B2
(45) Date of Patent: Jul. 10, 2018

(54) INTEGRATION OF FORM AND FILE SERVICES

(71) Applicant: SURVEYMONKEY INC., Palo Alto, CA (US)

(72) Inventors: Johan Vu Lieu, Menlo Park, CA (US); Larry Le Kuang, San Ramon, CA (US); Adam Harris Lichtenstein, Cupertino, CA (US); Krishna Om Yoga Vemuri, South San Francisco, CA (US)

(73) Assignee: SURVERYMONKEY INC., San Mateo, CA (US)

( * ) Notice: Subject to any disclaimer, the term of this patent is extended or adjusted under 35 U.S.C. 154(b) by 705 days.

(21) Appl. No.: 14/104,151

(22) Filed: Dec. 12, 2013

(65) Prior Publication Data
US 2015/0172356 A1    Jun. 18, 2015

(51) Int. Cl.
*H04L 29/06*        (2006.01)
(52) U.S. Cl.
CPC .................................. *H04L 63/08* (2013.01)
(58) Field of Classification Search
CPC ..... G06F 17/243; G06F 17/248; G06Q 10/00; H04L 63/08; H04L 63/0823; H04L 63/083
See application file for complete search history.

(56) References Cited

U.S. PATENT DOCUMENTS

| | | | | |
|---|---|---|---|---|
| 8,065,202 B1* | 11/2011 | Ballaro | ................ | G06Q 10/087 705/27.2 |
| 2002/0174010 A1* | 11/2002 | Rice, III | ........... | G06F 17/30194 705/14.67 |
| 2002/0194219 A1* | 12/2002 | Bradley | ............. | G05B 19/4189 715/213 |
| 2004/0039990 A1* | 2/2004 | Bakar | ................... | G06F 17/243 715/222 |
| 2004/0255243 A1* | 12/2004 | Vincent, III | ........ | G06F 17/2247 713/170 |
| 2008/0235779 A1* | 9/2008 | Bogner | ............... | H04L 63/0815 726/8 |
| 2010/0174974 A1* | 7/2010 | Brisebois | .............. | G06F 17/243 715/223 |
| 2011/0161802 A1* | 6/2011 | Jia | .......................... | G06F 17/24 715/235 |

(Continued)

OTHER PUBLICATIONS

Lelei, Using metadata to implement Eforms and their associated databases, 2010.*

(Continued)

*Primary Examiner* — Hadi S Armouche
*Assistant Examiner* — Huan V Doan
(74) *Attorney, Agent, or Firm* — Marger Johnson

(57) ABSTRACT

A system includes at least one forms service computing device, the forms service computing device executing code to produce a user interface allowing access to the forms service, a user computing device in communication with the forms service computing device, the user computing device capable of displaying the user interface from the forms service computing device, and at least one file service computing device, wherein the file service computing device is in communication with the forms service computing device, the forms service computing device providing access to the file service computer device through the user interface.

6 Claims, 4 Drawing Sheets

(56) References Cited

U.S. PATENT DOCUMENTS

2014/0325331 A1* 10/2014 Madireddi ............ G06F 17/243
715/224

OTHER PUBLICATIONS

Wang et al, Design and Implementation on Pen-based E-form Development Tool for End-user, 2012, IEEE, 4 pages.*
Shim et al, Federated Identity Management, IEEE, 3 pages (Year: 2005).*

* cited by examiner

INTEGRATION OF FORM AND FILE SERVICES

BACKGROUND

Many web services and web sites use forms to collect data. Examples include mailing lists, contact forms, satisfaction surveys, employment applications, event registrations, online order forms, party invitations, lead generation forms, software bug trackers, etc. The use of these forms is not limited to web designers and developers. Many 'everyday' users also desire to use forms for their websites, blogs, etc.

Users can now go to customizable forms websites and create, customize and store their own forms. Examples of these sites include WuFoo™, Formstack™ and Pandaform™. These forms typically gather information from customers or other users that are of interest to the user. The user may be notified of the new data gathered, such as a sale lead, by text, email, phone or RSS feed. However, the information typically remains in the forms service storage, as will the form. There is no link to a file service external to the forms service. One would have to download the files that submit them through the form, save it and then upload it to a file service. To have such a link would eliminate the download/upload portion of the process and the gathering of data external to the forms service control.

DETAILED DESCRIPTION OF THE EMBODIMENTS

Figure 1:
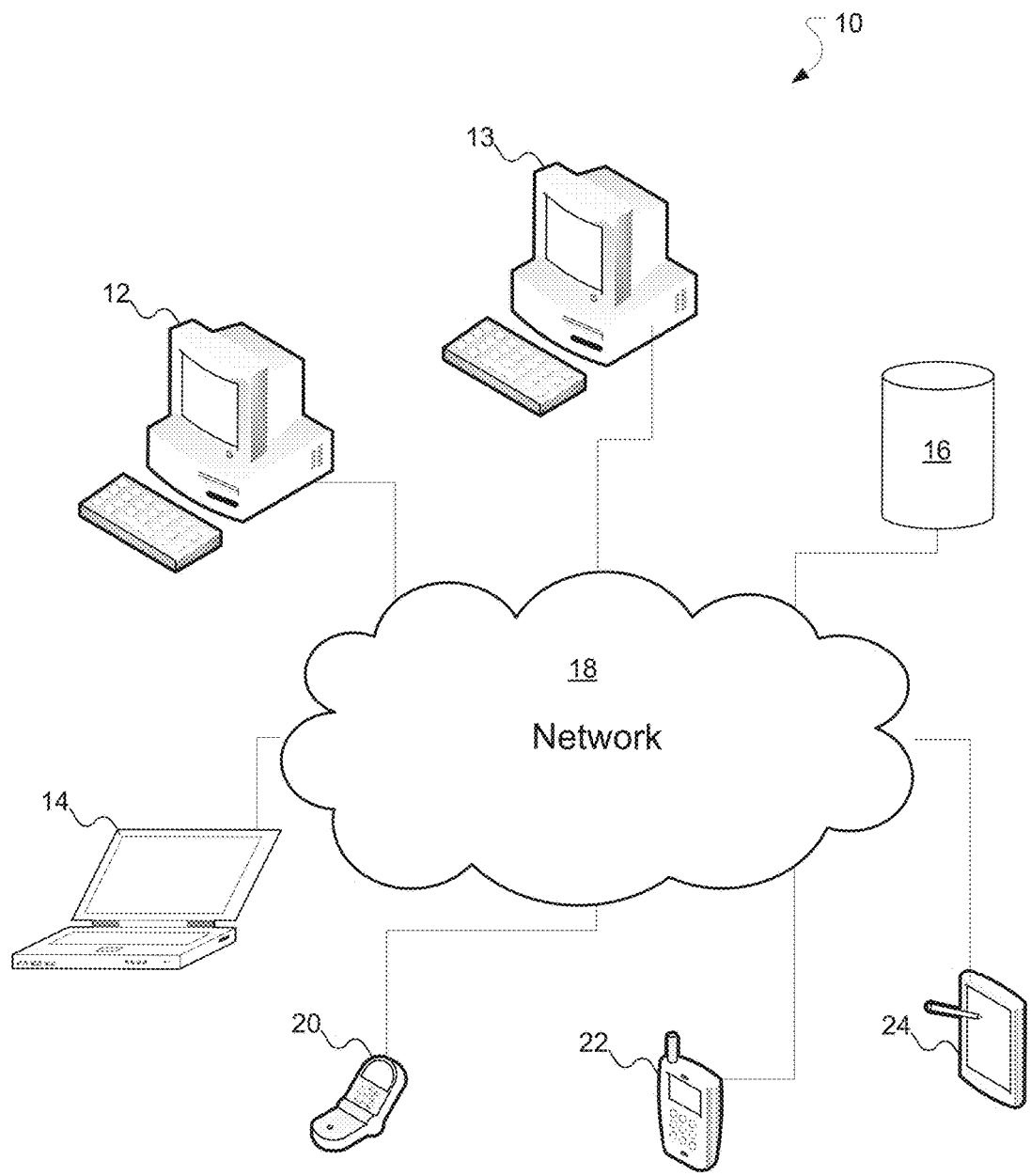
FIG. 1 shows an embodiment of a computer network including a customizable form server.

FIG. 1 shows an example of a networked system 10 in accordance with certain embodiments of the disclosed technology. In this example, the system 10 includes a network 18 such as the Internet, an intranet, a home network, a public network, or any other network suitable for implementing the embodiments discussed here. In the example, a forms service server 12 or other computing device may connect to the network 18 to communicate with each other or with other devices connected to the network. Similarly, a file service server 13 or other computing device may connect to the network 18. One should note that the term 'service' is used in the simplest form of the term, that of supplying a capability or activity to a user, rather than in any particular definition in networks, such as an application running in the network application layer. The forms and file services discussed here may take the form of an application but are not limited to that definition.

The system 10 may also include three mobile electronic devices 20, 22 and 24 as examples of a user's computing device. Two of the mobile electronic devices 20 and 22 may be communications devices such as may be cellular telephones or smartphones. Another of the mobile devices 24 may be a handheld computing device such as a personal digital assistant (PDA), tablet device, or other portable device. A storage device 16 may store some of all of the data that is accessed or otherwise used by any or all of the computers 12 and 14 and mobile electronic devices 20, 22 and 24. The storage device 16 may be local or remote with regard to any or all of the computers 12, 14 and mobile electronic devices 20-24. The storage device may consist of one or more databases, as will be discussed in more detail later, and may actually consist of one or many physical memory devices. Similarly, the forms service computing device and the file service computing device may actually consist of several computing devices and storage. One must note that the system of FIG. 1 is merely intended as an example to demonstrate possible devices connected to a network.

Figure 2:
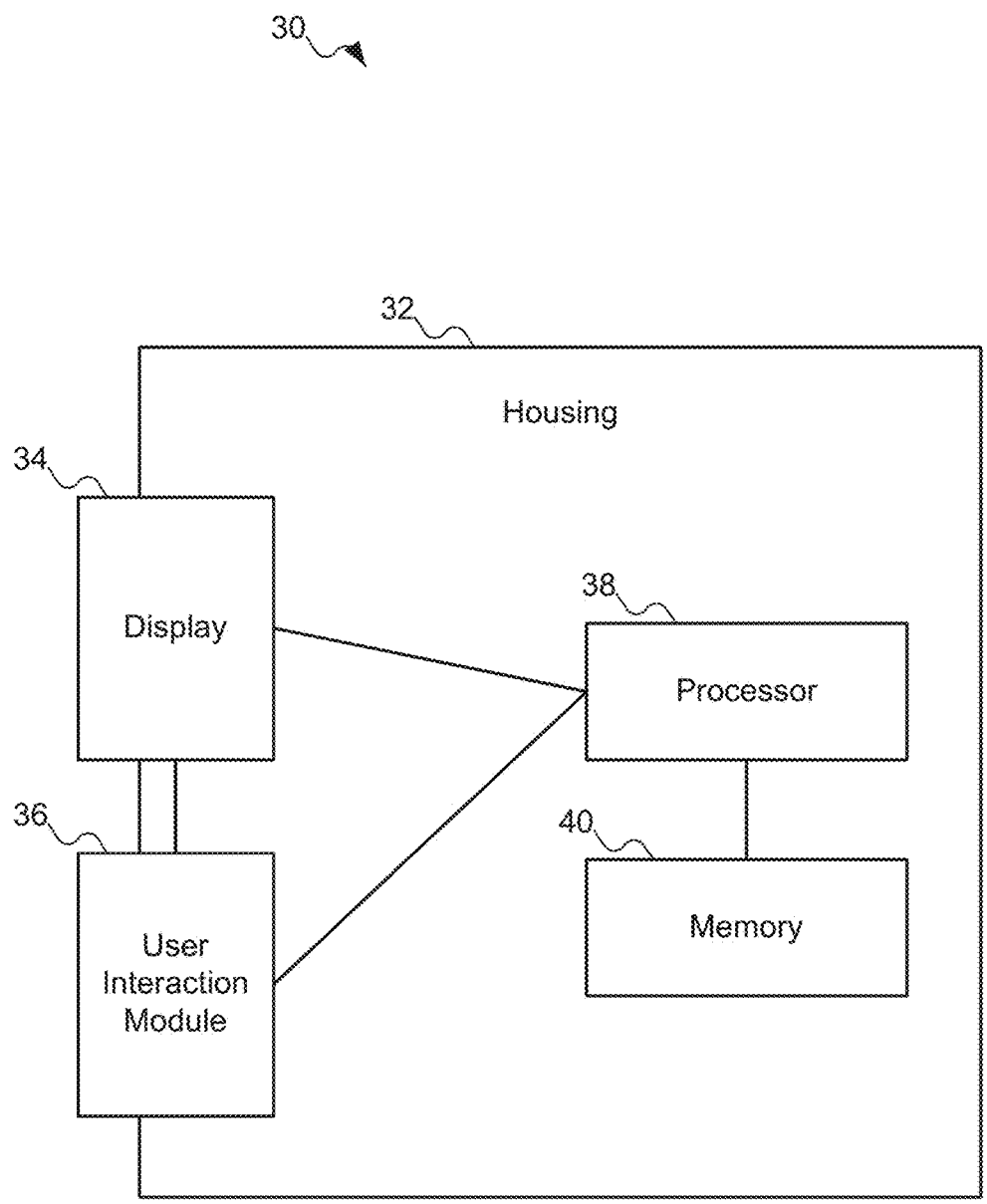
FIG. 2 shows a block diagram of an embodiment of a computing device.

FIG. 2 illustrates an example of an electronic device 30, such as any of the devices of FIG. 1, in which certain aspects of various embodiments of the embodiments may be implemented. The electronic device 30 may include, but is not limited to, a personal computing device such as a desktop or laptop computer, a mobile electronic device such as a PDA or tablet computing device, a mobile communications device such as a smartphone, an industry-specific machine such as a self-service kiosk or automated teller machine (ATM), or any other electronic device suitable for use in connection with certain embodiments of the disclosed technology.

In the example, the electronic device 30 includes a housing 32, a display 34 in association with the housing 32, a user interaction module 36 in association with the housing 32, a processor 38, and a memory 40. The user interaction module 36 may include a physical device, such as a keyboard, mouse, microphone, speaking, or any combination thereof, or a virtual device, such as a virtual keypad implemented within a touchscreen. The processor 38 may perform any of a number of various operations. The memory 40 may store information used by or resulting from processing performed by the processor 38. The display will allow the user to see a user interface generated from the forms service computing device and with the appropriate input fields, etc.

Figure 3:
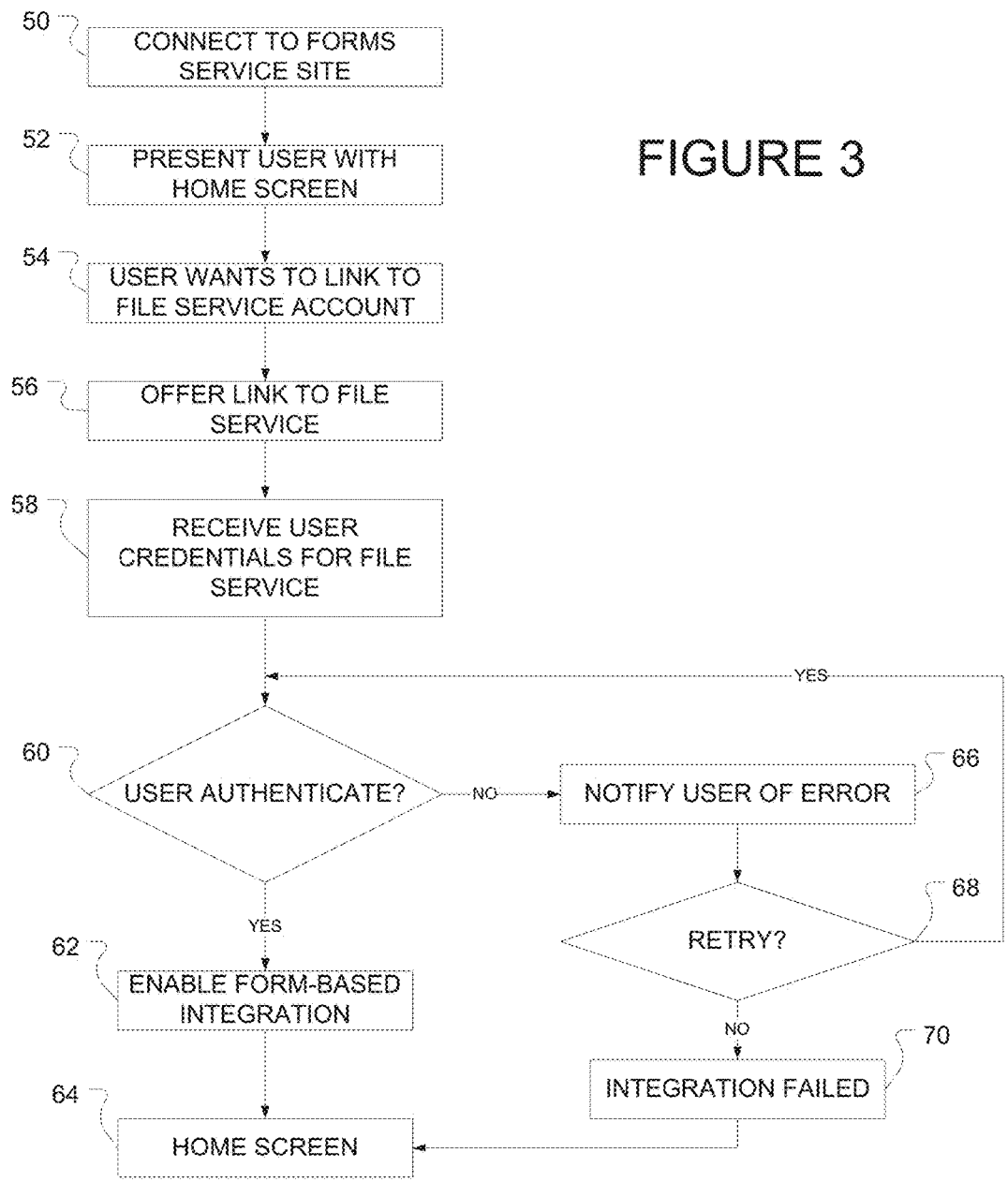
FIG. 3 shows an embodiment of a method of integrating a form service with a file service.

FIG. 3 shows an embodiment of a method of a forms service computing device that allows a user to integrate the user's file service with the user's forms service. A forms service provider allows a user to access their forms service's repository of form templates to create a customized form for use on the user's website or for other uses, or to start from scratch to develop a completely new form without the use of templates. The forms allow the user to gather data from their customers and save that data to the forms service storage. In order to differentiate between the user who sets up the form and the users that fill in the forms for the first user, the user who sets up the form will be referred to as the forms user. Typically, the forms service will allow the forms user to store forms and the data from the forms in the forms service storage, but the user cannot give access to users who are not forms service members. Similarly, as the forms are used by visitors to the user's website, or by recipients of an email containing the form, the forms user may receive notifications from the form service, but the notifications are not linked to a file service external to the forms server.

Figure 4:
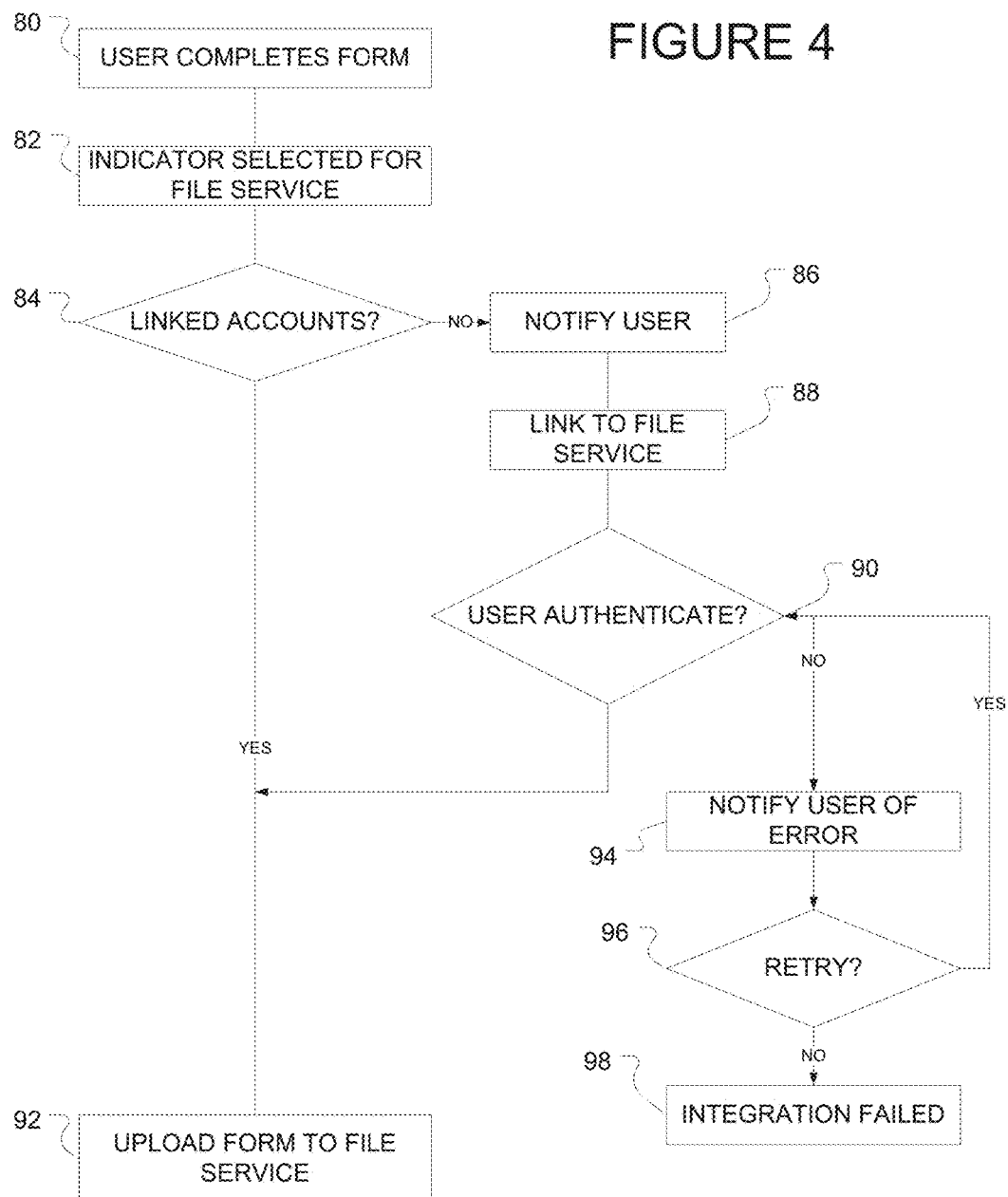
FIG. 4 shows an alternative embodiment of a method of integrated a form service with a file service.

The embodiments of FIGS. 3 and 4 show alternative methods of allowing a user to connect to the user's file service account through the forms service. In FIG. 3, the user connects to the forms service site 50 that allows the user to customize forms. The site will reside on a forms service computing device or devices, such as a server, etc. The user logs in by providing a credential or credentials such as a username and password for the forms service. The forms service will present the user with a 'home screen' 52 that may show such things as the user's list of forms, previously created forms, contain announcements, etc. When a customer creates a form, there is typically a notification feature that allows the forms user to receive notifications when the form is filled out by a user or customer. The notifications are currently done by text, email or RSS feed. The data is gathered by the forms service and resides on a forms service computing device.

In FIG. 3, the forms user can link his or her file server account to a form. Whenever a user fills out the form, the resulting file is uploaded to the forms user's file server account. FIG. 3 shows an embodiment where a forms user knows that the filled out forms will go to a file service account. The forms user proactively links his or her forms service account with his or her file service account. At 54, the forms user indicates that the forms user wants to connect the forms user's forms service account with the forms user's file service account. This process of linking the two accounts and the interaction between the two services may be referred to here as 'integration.'

At 56, the forms service offers a link for the forms user to access the form user's account on the file service. The file service needs to authenticate the user, but the forms user will provide his or her credentials through the forms service user interface. The forms service receives the user credentials for the file service at 58 and transmits them to the file service. One should not that the forms service may not actually 'transmit' the credentials as a separate communication, the transmission may just take the form of having opened a portal for the forms user to send his or her credentials to the file service.

The file service notifies the user whether or not the user has been authenticated at 60, which also serves to notify the forms service that the account is valid and useable. Once the forms service has validated the user's file service account, it will enable form-based integration for the user at 62 and return the forms user to the home screen. Form-based integration means that each form the user creates from now on will have a new checkbox or other upload indicator of designating that the form and its responses should be uploaded to the file service. Further, the logo of the file service may be added to the user's home screen or another screen that shows any applications which the forms user has integrated.

If the forms user does not authenticate at 60, the forms service will notify the user of the error at 66. The forms user will then be given the opportunity to retry at 68. If for some reason the forms user does not want to integrate at this time, the forms service will fail the integration at 70 and continue on to the forms user's home screen.

In the above process, several opportunities exist to notify the user of any problems or issues that may exist. For example, the forms user may want to connect his or her forms service account with the file service account, but that feature is only available for particular forms users. This may involve forms users having paid accounts, accounts of a certain level, etc. The forms service can notify the forms user of these issues to allow the user to take action to fix the issue.

Similarly, the forms user may not indicate on a form that the form should be uploaded to the file service. The forms service can prompt the forms user to ensure the box is checked, or query the user as to whether the upload indicator should be set for that form.

As mentioned previously, FIG. 4 shows an alternative embodiment, where the forms user did not proactively link the forms service account to the file service account. At 80, the forms user completes a form. The forms service provides an upload indicator on the form. When the forms service receives the form with the indicator selected at 82, the forms service confirms the forms user's file service account at 84. If the forms service sees that the forms user does not have a linked file service account, it notifies the forms user at 86. The file service then allows the forms user to link to and authenticate with the file service at 88. If the authentication occurs at 90, the form will be uploaded to the forms users' file service account as it is filled out by other users at 92. If the user cannot be authenticated at 88, the forms user is notified of the error at 94 and allowed to retry at 96. If the user decides not to upload the form, the integration fails at 98 and the form user returns to the home screen or the form.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system, comprising:
at least one forms service computing device controlled by a forms service provider, the forms service computing device executing code to produce a user interface for the forms service on a user interface on a user computing device allowing access to the forms service computing device, wherein the forms service computing device has a forms service account authentication;
a user computing device in communication with the forms service computing device, the user computing device to display the user interface from the forms service computing device, the user interface to receive forms service account credentials through the user interface on the user computing device to allow the forms service computing device to authenticate a user and allow a user to access to the forms service computing device; and
at least one file service computing device controlled by a file service provider, wherein the file service computing device is in communication with the forms service computing device, the forms service computing device providing access to the file service computer device through the user interface provided by the forms service computing device to upload, download and store completed forms on the file service computing device for access without the form service computing device based upon user inputs from the user through the user interface, and the forms service computing device executes code to provide the user interface displayed on the user computing device to receive file service account credentials for the file service account authentication of the user to the file service computing device, wherein the file service account authentication occurs as one of either setting up a file service account for the user, or linking to an existing account for the user, the file server computing device to send a response to the user through the user interface provided by the forms service computing on a user computing device, and file service account credentials for the user are different from the forms service account credentials for the user, the forms service computing device to receive input through the user interface to create a form and then to store the form on the file service computing device.

2. A computer-controlled method, comprising:
receiving, at a forms service computing device, user credentials for a forms service from a user through a user interface on a user computing device;
authenticating, using the forms service computing device, the user from the user credentials;
providing a connection to a file service computing device, from a user interface provided by the forms service computing device;
receiving, at the forms service computing device, user credentials for the file service received from the user through the user interface on the user computing device, wherein the user credentials for the file service are different from the user credentials for the forms service;
transmitting the user credentials for the file service to the file service computing device, from the forms service computing device, from the forms service device as one of either setting up a file service account for the user, or linking to an existing account for the user;
receiving a response from the file service computing device about user authentication at the file service computing device;
communicating the response to the user through the user interface on the user computing device;
receiving inputs through the user interface to the forms service computing device to create a form;
receiving an input indicating that the form is complete; and
performing at least one of uploading, downloading and storing the form on the file service computing device for access without the forms service computing device.

3. The computer-controlled method of claim 2, wherein transmitting the form to the file service computing device comprises:
accessing information about the user from the file service computing device, including a name of at least one folder;
querying the user into which folder the form is to be saved;
receiving a user response identifying the folder; and
transmitting the form to the folder on the file service computing device.

4. The computer-controlled method of claim 2, further comprising:
providing the user access to a customizable form that resides on the forms service computing device;
receiving user inputs corresponding to customization of the form to produce a customized form; receiving a user input indicating form completion;
receiving a user input indicating that the form is to be saved to the file service computing device; and
providing the connection to the file service computing device after receiving the user input indicating that the form is to be saved.

5. The computer-controlled method of claim 4, wherein providing the connection to the file service computing device comprises:
accessing information about the user from the file service computing device, including a name of at least one user folder;
querying the user into which user folder the form is to be saved;
receiving a user response identifying the user folder; and
transmitting the customized form to the user folder on the file service computing device.

6. The computer-controlled method of claim 4, wherein providing a connection to the forms service computing device comprising providing a link to the forms service computing device on a home screen of the user interface.

* * * * *